United States Patent Office 3,449,042
Patented June 10, 1969

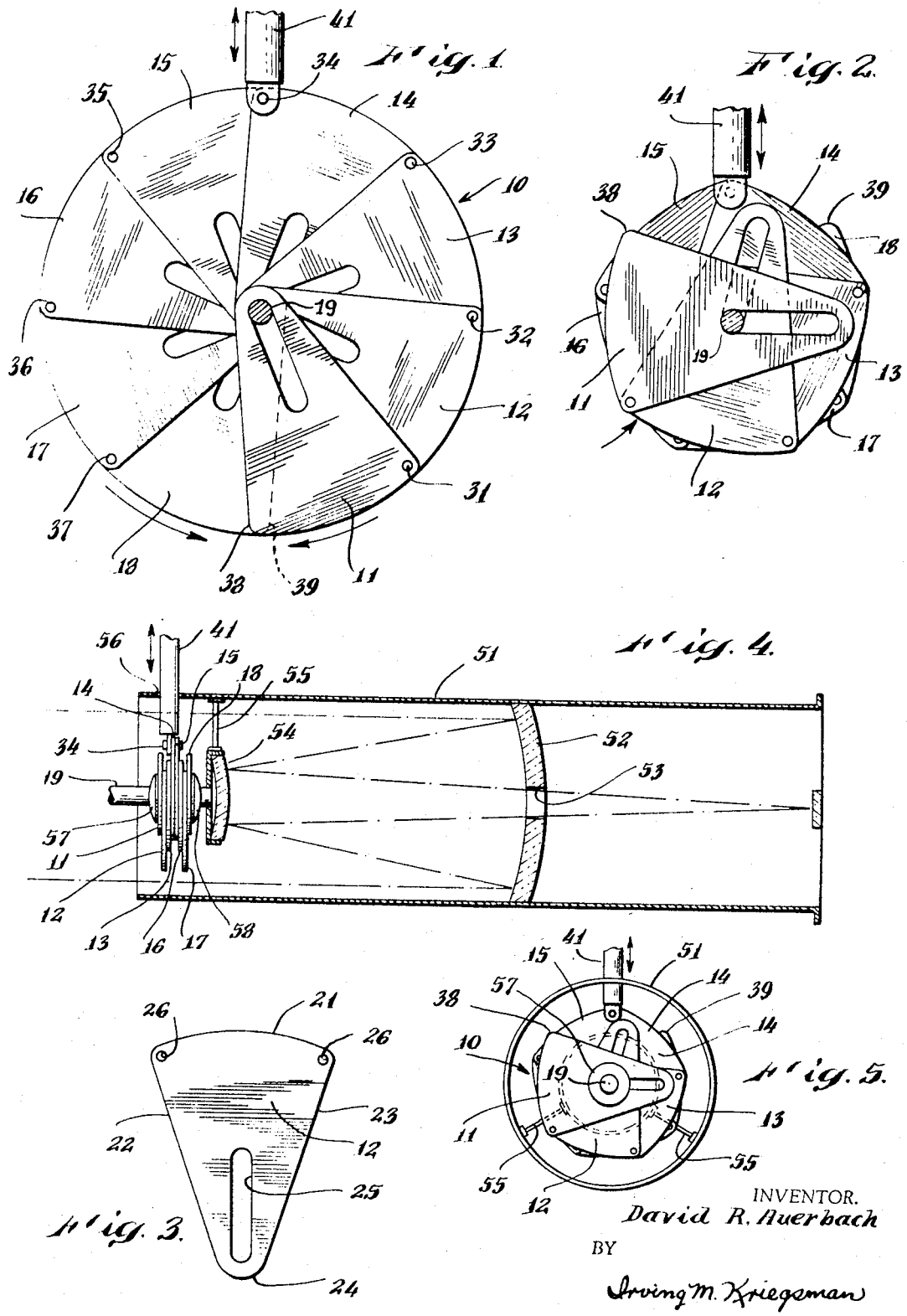

3,449,042
EXPANDABLE DIAPHRAGM
David R. Auerbach, Wilton, Conn., assignor to The Perkin-Elmer Corporation, Norwalk, Conn., a corporation of New York
Filed Sept. 23, 1966, Ser. No. 581,618
Int. Cl. G03b 9/02; G02f 1/30
U.S. Cl. 350—273                                10 Claims

ABSTRACT OF THE DISCLOSURE

This invention comprises an expandable optical diaphragm having a plurality of blades which slide outward to obstruct an annular aperture.

---

The invention relates to expandable diaphragms. More particularly, this invention relates to an expandable optical diaphragm especially suited for use in mirror cameras or other two mirror optical systems.

Conventional optical diaphragms vignette the light bundle by varying the size of a centrally located aperture. Such diaphragms generally comprise a plurality of asymmetrical leaves confined on each side by two discs. Each leaf is hinged to both discs at different points so that when the discs are rotated in relation to each other, the leaves swing an arc inward, thus decreasing the size of the central aperture. Although these diaphragms are satisfactory for conventional cameras in which the light bundle is projected along a central axis, they are not very adequate in mirror cameras or other two mirror optical systems. This is mainly due to the fact that in mirror objectives the central portion of the light bundle is intercepted by an image carrier or secondary mirror. Because of this central obstruction, the central aperture of the diaphragm and hence the diaphragm itself must be extremely large in relation to the light bundle.

It has been proposed to provide for an optical diaphragm in which a plurality of radially extending blades rotate about their own longitudinal axes in a plane normal to the optical axis. However, such an arrangement is extremely complicated mechanically and partly obstructs the light bundle when the blades are in their open position.

Accordingly, it is an object of this invention to provide a new and improved expandable diaphragm.

It is another object of this invention to provide an expandable optical diaphragm for use in mirror cameras and other similar two mirror optical systems.

It is still another object of this invention to provide an expandable optical diaphragm for use in varying the intensity of an annularly shaped light bundle.

It is yet still another object of this invention to provide an expandable diaphragm that is light in weight, mechanically simple and easy to fabricate.

It is another object of this invention to provide an optical diaphragm for use in two mirror optical systems that will not obstruct the light bundle when in an open position.

The above and other objects and many attendant advantages are achieved by means of a new and novel expandable diaphragm constructed in accordance with this invention.

Generally speaking, the diaphragm is shaped in the form of a circular plate or disc. The diaphragm is made up of a plurality of moveable blades which are mounted and interconnected in such a way that the overall diameter of the disc can be varied. The diaphragm is intended to be positioned with its center along the optical axis of the light bundle.

Thus, the aperture and hence the light bundle is annularly shaped with its outer diameter being defined by the system housing and its inner diameter being defined by either the central obstruction or the disc-like diaphragm, whichever is larger. Accordingly, with the diaphragm in its contracted or small diameter position the annularly shaped aperture will be at a maximum. However, when the diaphragm is in its expanded or large diameter position the annularly shaped aperture will be at a minimum.

The invention will be readily appreciated as the same becomes better understood by reference to the following detailed description when taken in connection with the accompanying drawings in which like reference numerals represent like parts throughout the figures thereof and wherein:

FIGURE 1 is a front view of the diaphragm when expanded;

FIGURE 2 is a front view of the diaphragm shown in FIGURE 1 when contracted;

FIGURE 3 is a front view of one of the blades shown in FIGURE 1;

FIGURE 4 is a section view of the diaphragm mounted in a two mirror optical system; and FIGURE 5 is a left end view of the optical system shown in FIGURE 4.

Referring now to the drawings, there is shown in FIGURES 1 and 2 an embodiment of an expandable diaphragm 10 constructed in accordance with this invention. In FIGURE 1 the diaphragm 10 is in an expanded or open postion whereas in FIGURE 2 the diaphragm 10 is in a closed or contracted postion.

The diaphragm 10 includes a plurality of flat elongated opaque blades 11 through 18 arranged in a stacked relationship and mounted for rotational and radial movement on a pin or other similar circular cross-sectioned member 19. For ease in understanding, the two outer or end blades in the stack are identified by reference numerals 11 and 18 respectively whereas the inner or intermediate blades are identified by reference numerals 12 through 17.

All of the blades 11 through 18 are identical in size and shape. One of the intermediate blades 12 is shown in FIGURE 3.

As can be seen, the blade 12 is substantially sector shaped, having an arcuate outer edge 21 and a pair of inwardly tapered side edges 22 and 23, which meet at an apex-like inner end 24. The blade 12 is further provided with a clearance slot 25 for the pin member 19 which extends along the longitudinal axis of the blade from near the apex 24 to approximately one-half its length. A small pivot pin hole 26 is locted near each end of the arcuate shaped outer edge 21.

For reasons which will become readily apparent, outer or end blades 11 and 18 are only provided with a single pivot pin hole which is located at one end of their respective arcuate edges.

Blades 11 through 18 are pivotally connected to each other in a series relationship at their outer arcuate edges by means of pivot pins 31 through 37. Thus, pivot pin 31 connects blade 11 to blade 12, pivot pin 32 connects blade 12 to blade 13 and so forth. End 38 of blade 11 and end 39 of blade 18 are unconnected.

Thus, each of the blades can rotate and move radially with respect to the shaft 19 and in addition each is pivotally connected at one end of its outer edge to the blade immediately adjacent thereto.

Operating means in the form of a handle 41 is pivotally connected to the blades, preferably at pivot pin 34 which is diametrically opposite from the two unconnected ends 38 and 39.

Opening and closing of the diaphragm 10 is achieved by a radial movement of the handle 41, as shown by the arrows. As can be seen, all the blades on one side of the handle 41 rotate in one direction whereas all the blades on the other side of the handle rotate in an opposite direction.

The plurality of 8 blades shown in the drawings is by way of illustration only and not deemed to be critical. It has been found desirable, however, to have at least 4 blades.

Referring now to FIGURES 4 and 5, there is shown the diaphragm 10 mounted in a two mirror optical system. The system includes a tubular housing 51, a concave spherical mirror 52 having a central aperture 53 and a convex intercepting mirror 54. The convex intercepting mirror 54 is mounted on a supporting spider-like frame 55. The supporting pin 19 for the iris diaphragm 10 is rigidly connected to the supporting frame 55. Housing 51 is provided with an opening 56 through which the operating means 41 extends. A pair of spring washers 57 and 58 are mounted on the pin 19 at either end of the stack of blades 11 through 18.

What is claimed is:
1. An expandable optical diaphragm comprising a plurality of blades swingable over one another and pivotally interconnected to each other in series relationship, each of said blades having a longitudinal slot, pivot means extending through the slot of each blade at right angles to each blade for supporting rotational and radial movement of said plurality of blades, and means connected to said blades for effecting radial and rotationl movement of said plurality of blades relative to said pivot means.

2. The invention according to claim 1 and wherein said pivot means comprises an elongated rigid member having a circular cross section.

3. The invention according to claim 1 and wherein said blades are flat, elongated, equally sized and equally shaped.

4. The invention according to claim 3 and wherein said blades are symmetrically shaped.

5. The invention according to claim 4 and wherein each blade is shaped substantially in the form of a sector of a circle having an arcuate outer edge, and a pair of inwardly tapering side edges which meet at an apex.

6. The invention according to claim 5 and wherein said longitudinal slot of each blade extends from near the apex to approximately one-half its length.

7. The invention according to claim 6 and wherein said plurality of blades are pivotally connected in series near their outer arcuate edges.

8. The invention according to claim 7 and wherein said means for effecting rotational and radial movement of said blades comprises a handle pivotally connected to one of said blades.

9. An expandable optical diaphragm for use in an optical system containing a central obstruction comprising a rod mounted in axial alignment along the optical axis of the optical system and a segmented disc mounted on said rod, said segmented disc comprising a plurality of sector shaped members arranged in a stack and mounted on said rod for rotational and radial movement relative to said rod, and means for pivotally connecting in series each sector shaped member near its outer edge to the next adjacent sector shaped member for relative swinging movement over one another.

10. An expandable diaphragm comprising a rod, and a segmented disc mounted on said rod, said segmented disc comprising a plurality of sector shaped members arranged in a stack and pivotally connected in series at their outer edges for relative swinging movement over one another, each sector shaped member being mounted on said rod for rotational and radial movement relative to said rod.

References Cited
UNITED STATES PATENTS

| | | |
|---|---|---|
| 743,181 | 11/1903 | Mentzer _____ 240—46.27 XR |
| 909,447 | 1/1909 | Pearson et al. |
| 1,813,102 | 7/1931 | Vogel. |
| 1,873,310 | 8/1932 | Doane. |
| 2,513,961 | 7/1950 | Ostrom. |
| 2,735,929 | 2/1956 | Erhardt et al. ____ 350—273 XR |
| 2,762,259 | 9/1956 | Bouwers et al. ____ 350—273 XR |
| 2,995,997 | 8/1961 | Nieuwenhoven ___ 350—206 XR |

RONALD I. WILBERT, *Primary Examiner.*

G. BAUM, *Assistant Examiner.*

U.S. Cl. X.R.

95—64; 250—229; 350—206, 266